United States Patent
Himmelmann

(10) Patent No.: US 7,803,085 B2
(45) Date of Patent: Sep. 28, 2010

(54) ELECTRICALLY DRIVEN PARALLEL SHAFT TRANSMISSION THAT MAINTAINS DELIVERED POWER WHILE SHIFTING

(75) Inventor: Richard A. Himmelmann, Beloit, WI (US)

(73) Assignee: Hamilton Sundstrand Corporation, Rockford, IL (US)

(*) Notice: Subject to any disclaimer, the term of this patent is extended or adjusted under 35 U.S.C. 154(b) by 516 days.

(21) Appl. No.: 11/779,913

(22) Filed: Jul. 19, 2007

(65) Prior Publication Data
US 2009/0019967 A1    Jan. 22, 2009

(51) Int. Cl.
*B60K 5/08* (2006.01)
*B60K 17/04* (2006.01)
*F16H 37/06* (2006.01)

(52) U.S. Cl. .......................... 477/2; 74/661; 74/665 A; 180/371

(58) Field of Classification Search .................. 477/2, 477/3; 475/5; 74/661, 665 A, 665 B, 329, 74/331; 180/371, 245, 246
See application file for complete search history.

(56) References Cited

U.S. PATENT DOCUMENTS

| | | | |
|---|---|---|---|
| 5,199,314 A * | 4/1993 | Hutchison | .................. 74/335 |
| 5,558,588 A | 9/1996 | Schmidt | |
| 5,558,589 A | 9/1996 | Schmidt | |
| 5,587,647 A | 12/1996 | Bansal et al. | |
| 5,603,672 A * | 2/1997 | Zhang | .................. 477/110 |
| 5,991,683 A | 11/1999 | Takaoka et al. | |
| 6,558,283 B1 | 5/2003 | Schnelle | |
| 6,793,034 B2 | 9/2004 | Raftari et al. | |
| 6,793,600 B2 | 9/2004 | Hiraiwa | |
| 6,827,165 B2 | 12/2004 | Schmidt | |
| 6,838,778 B1 | 1/2005 | Kandil et al. | |
| 7,116,003 B2 | 10/2006 | Hoppe | |
| 7,125,362 B2 * | 10/2006 | Beaty et al. | .................. 477/3 |
| 7,134,516 B2 * | 11/2006 | Eisenhardt et al. | ..... 180/65.235 |
| 7,140,240 B2 | 11/2006 | Gustafson et al. | |
| 2002/0088288 A1 * | 7/2002 | Bowen | .................. 74/331 |
| 2003/0166429 A1 | 9/2003 | Tumback | |
| 2003/0224892 A1 | 12/2003 | Yamauchi et al. | |
| 2003/0232678 A1 | 12/2003 | Yamauchi et al. | |
| 2004/0084234 A1 | 5/2004 | Yatabe et al. | |
| 2004/0251064 A1 | 12/2004 | Imai | |
| 2005/0064974 A1 | 3/2005 | Bezian et al. | |
| 2005/0164827 A1 | 7/2005 | Beaty et al. | |

* cited by examiner

*Primary Examiner*—Roger Pang
(74) *Attorney, Agent, or Firm*—Carlson, Gaskey & Olds

(57) ABSTRACT

An electrically powered driveline assembly includes a first electric motor and a second electric motor that drive corresponding input shafts to drive an output shaft. The first and second electric motors are selectively coupled to facilitate constant torque and speed output of the output shaft during shifting and also in the event of failure of one of the electric motors.

20 Claims, 10 Drawing Sheets

ELECTRICALLY DRIVEN PARALLEL SHAFT TRANSMISSION THAT MAINTAINS DELIVERED POWER WHILE SHIFTING

BACKGROUND OF THE INVENTION

This invention generally relates to an electric motor powered driveline. More particularly, this invention relates to an electric motor powered driveline and method of operation that provides continuous torque during shifting operations.

Conventional transmissions require a release of torque to facilitate a shift between desired gear ratios. In most applications such a momentary release of torque is not a concern. However, in vehicles where speed and output torque is utilized for steering, a momentary release in torque can undesirably effect steering and maneuverability.

Accordingly, it is desirable to design and develop an electric motored powered driveline that switches between desired gear ratios while maintaining a constant torque output.

SUMMARY OF THE INVENTION

An example electric driveline assembly utilizes two electric motors that drive an output shaft that provides continuous uninterrupted torque output during gear shifting operations.

The disclosed example electric driveline assembly includes first and second electric motors that drive parallel input shafts that in turn drive the output shaft. The first and second electric motors drive a corresponding set of first and second gears that both drive the output shaft during normal operation. During gear shift changes, one of the two electric motors increases power level to maintain the desired torque output. The other motor is disengaged while the gear change is performed. The motor that had previously been engaged at an increased torque output is then disengaged concurrently with reengagement of the previously disengaged motor. A corresponding gear change is made to the disengaged motor while the reengaged motor drives the output shaft at the desired torque. Once both input shafts have made gear changes, both motors are reengaged to drive the output shaft at normal levels.

The example electric drive line assembly is not mechanically driven or connected to a power conversion device or combustion engine and is driven by only the first and second electric motors. This enables the drive line assembly to operate independent of any combustion engine or power generating device and to maintain operation even though a fault may disrupt operation of one of the first and second electric motors.

These and other features of the present invention can be best understood from the following specification and drawings, the following of which is a brief description.

DETAILED DESCRIPTION OF AN EXAMPLE EMBODIMENT

Figure 1:
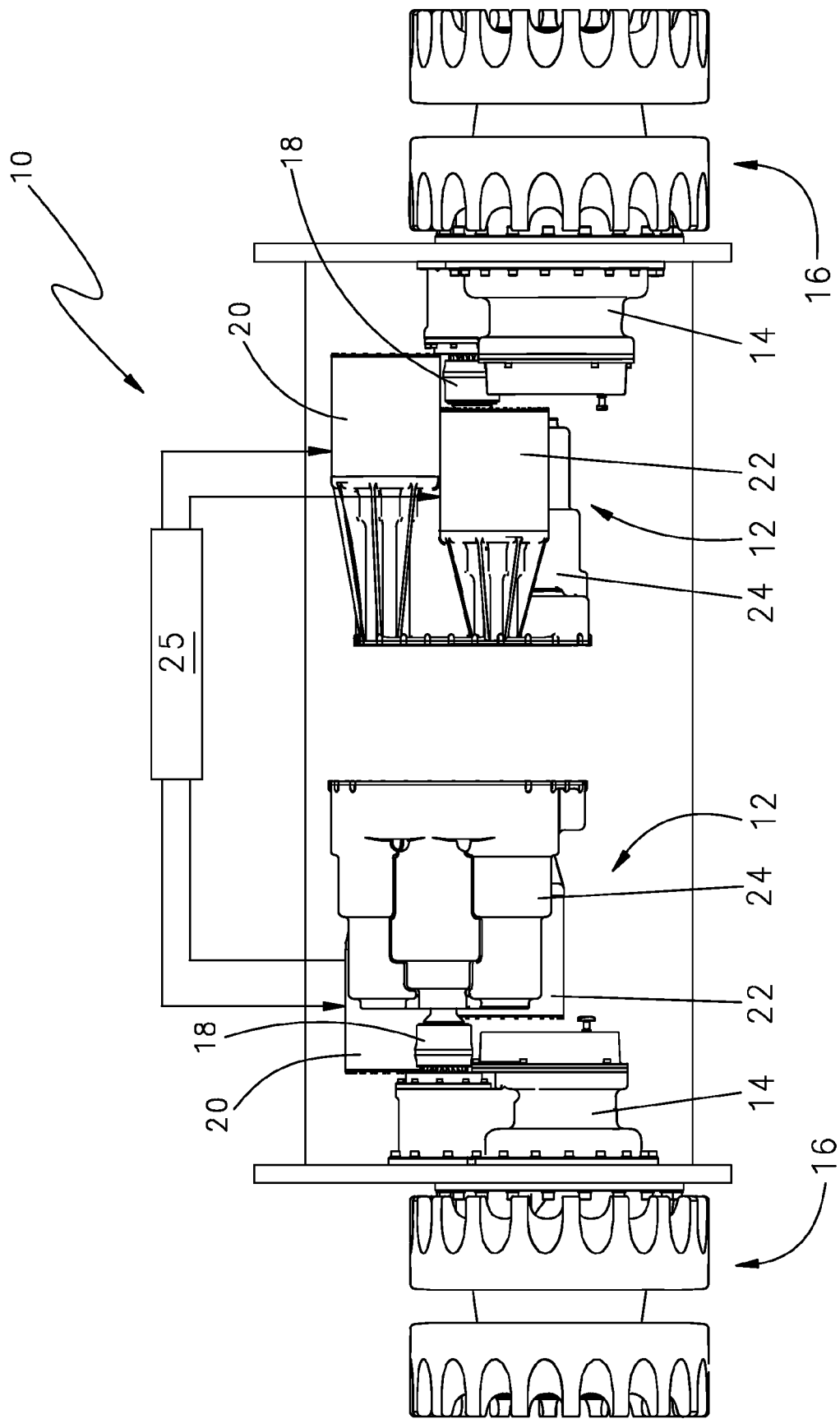
FIG. 1 is a front view of an example vehicle drive unit.

Referring to FIG. 1, an example propulsion assembly 10 comprises electrically powered driveline assemblies 12 that each include a first electric motor 20 and a second electric motor 22 that drives an output 18. The output 18 drives a final drive assembly 14 that in turn is attached and drives a sprocket assembly 16. The driveline assembly 12 is enclosed within a housing 24. A controller 25 is provided to control power output and operation of the first and second electrical motors 20, 22. The example driveline assembly 12 is utilized in heavy vehicles such as those utilizing tracks as the mode of propulsion and steering.

The driveline assemblies 12 are not mechanically linked to a power conversion device. The power conversion device may be an internal combustion engine or any other power conversion device that provides and generates electrical energy that drives the first and second electric motors 20, 22.

The example propulsion assembly 10 is utilized for a track vehicle where the driveline assemblies 12 are utilized both for propulsion and for steering. Because the propulsion system is also utilized for vehicle steering, power is always provided to the output 18 in a desired amount of torque. The driveline assemblies 12 operate independently of each other so that power to the sprockets 16 may vary to accomplish the desired turning and steering of the vehicle (not shown). Further, each of the first and second motors 20, 22 of each of the driveline assemblies 12 operate together to provide continuous and uninterrupted torque to the output 18 during gear changes.

Figure 2:
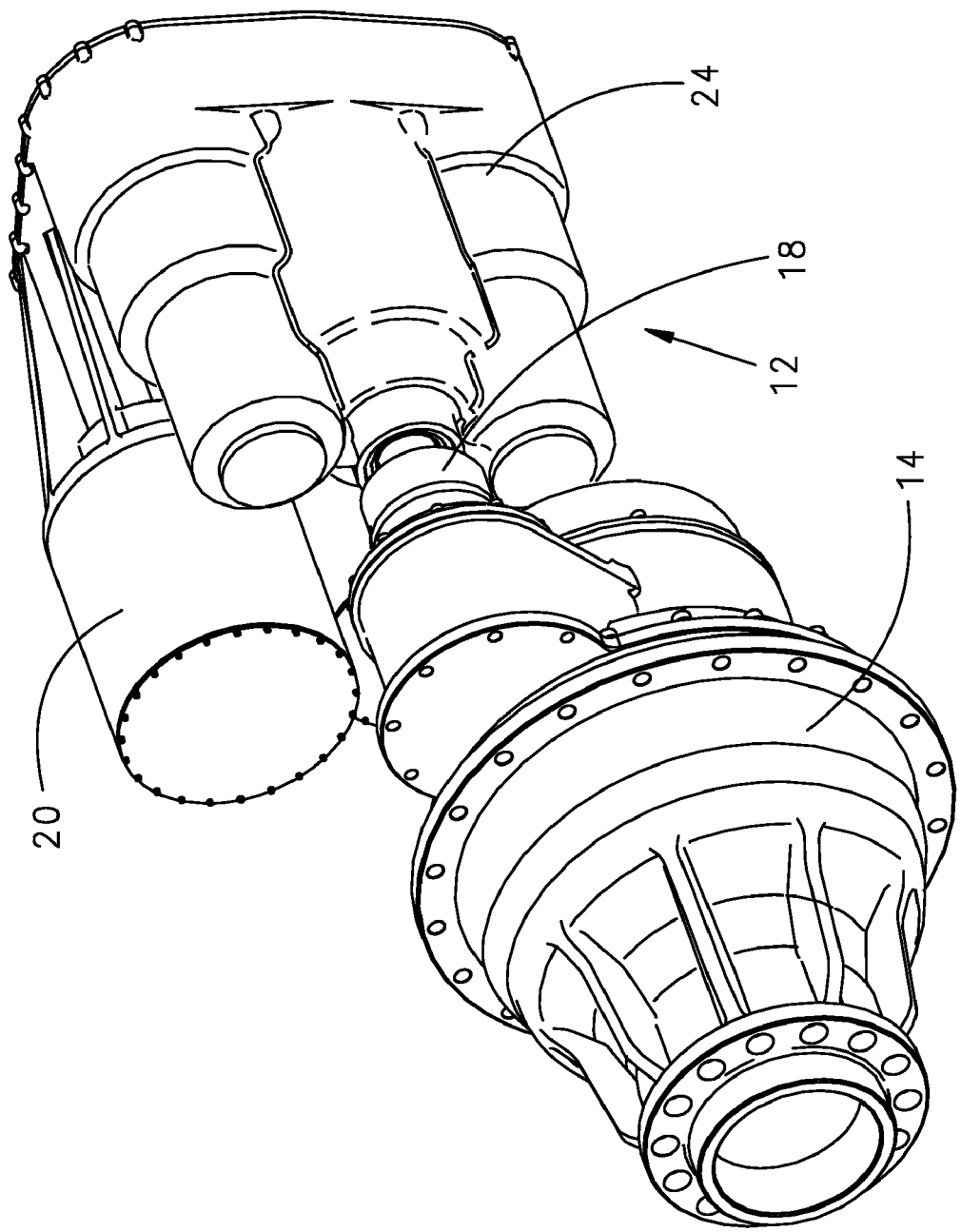
FIG. 2 is a perspective view of an example driveline assembly and final drive unit.

Referring to FIG. 2, one side of the propulsion assembly 10 is illustrated and includes the final drive 14 that is driven by an output 18 from the driveline assembly 12. The driveline assembly 12 is enclosed within the housing 24 and includes the motors 20, 22.

Figure 3:
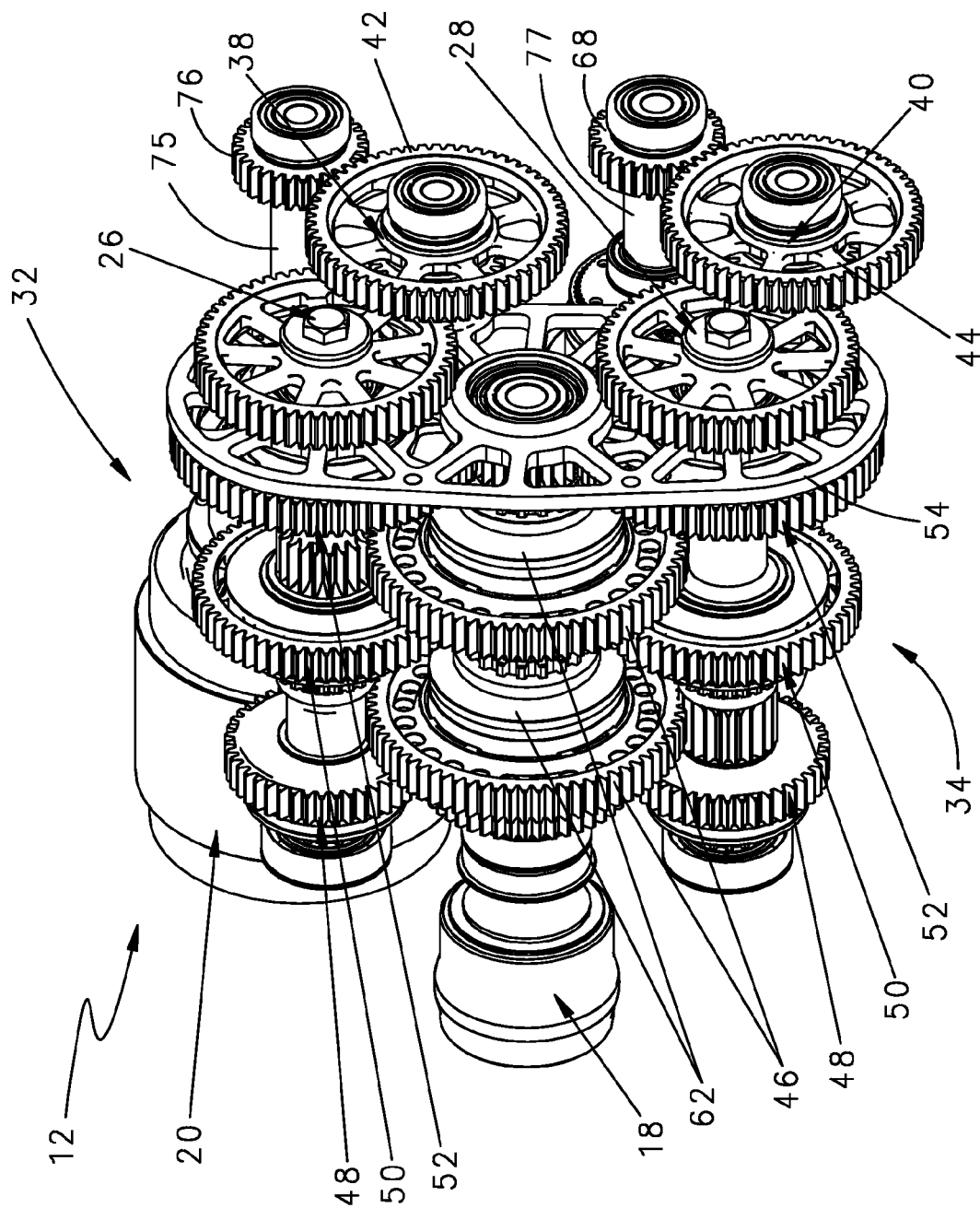
FIG. 3 is a perspective view of the example driveline assembly.
Figure 4:
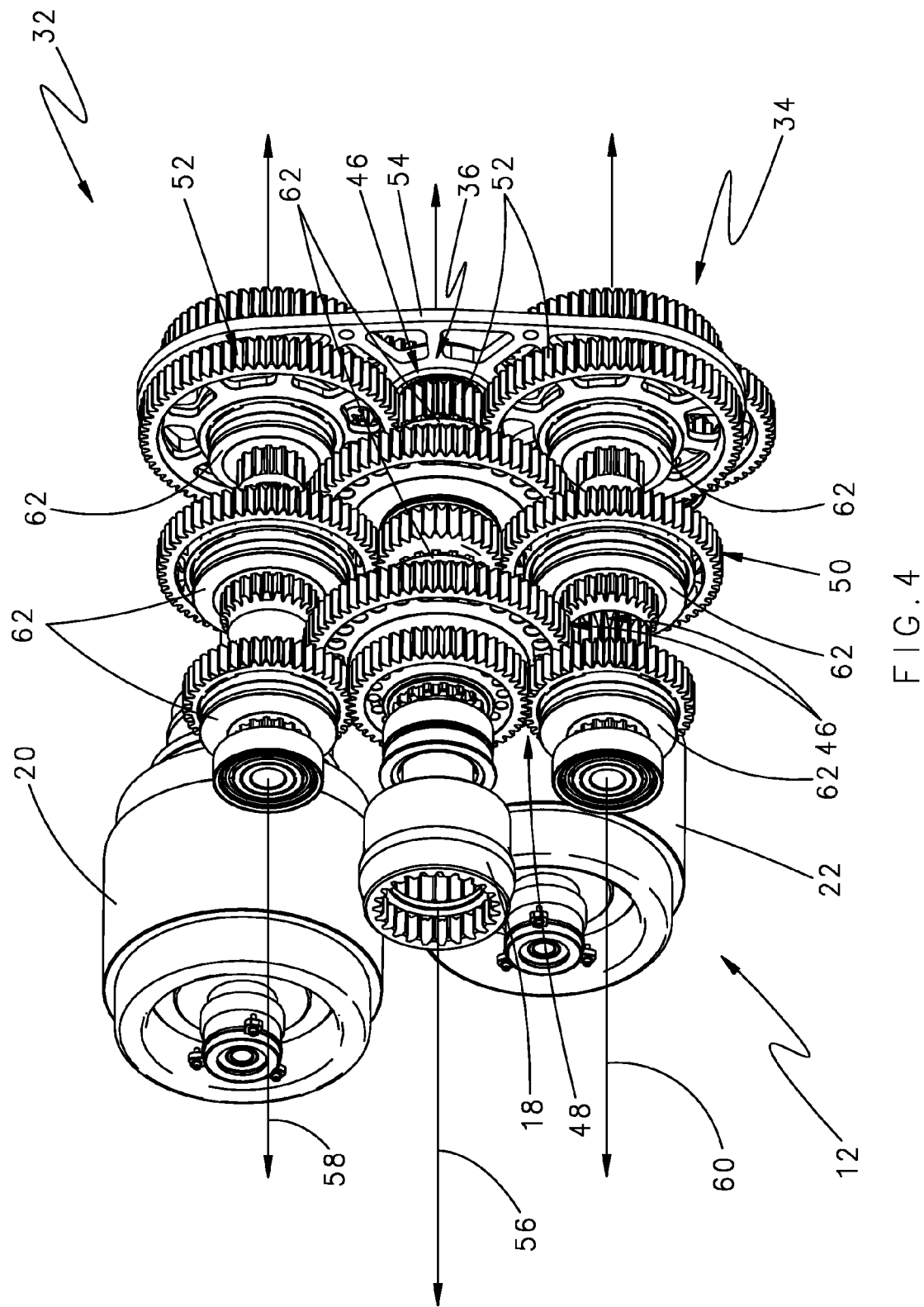
FIG. 4 is another perspective view of the example driveline assembly.
Figure 5:
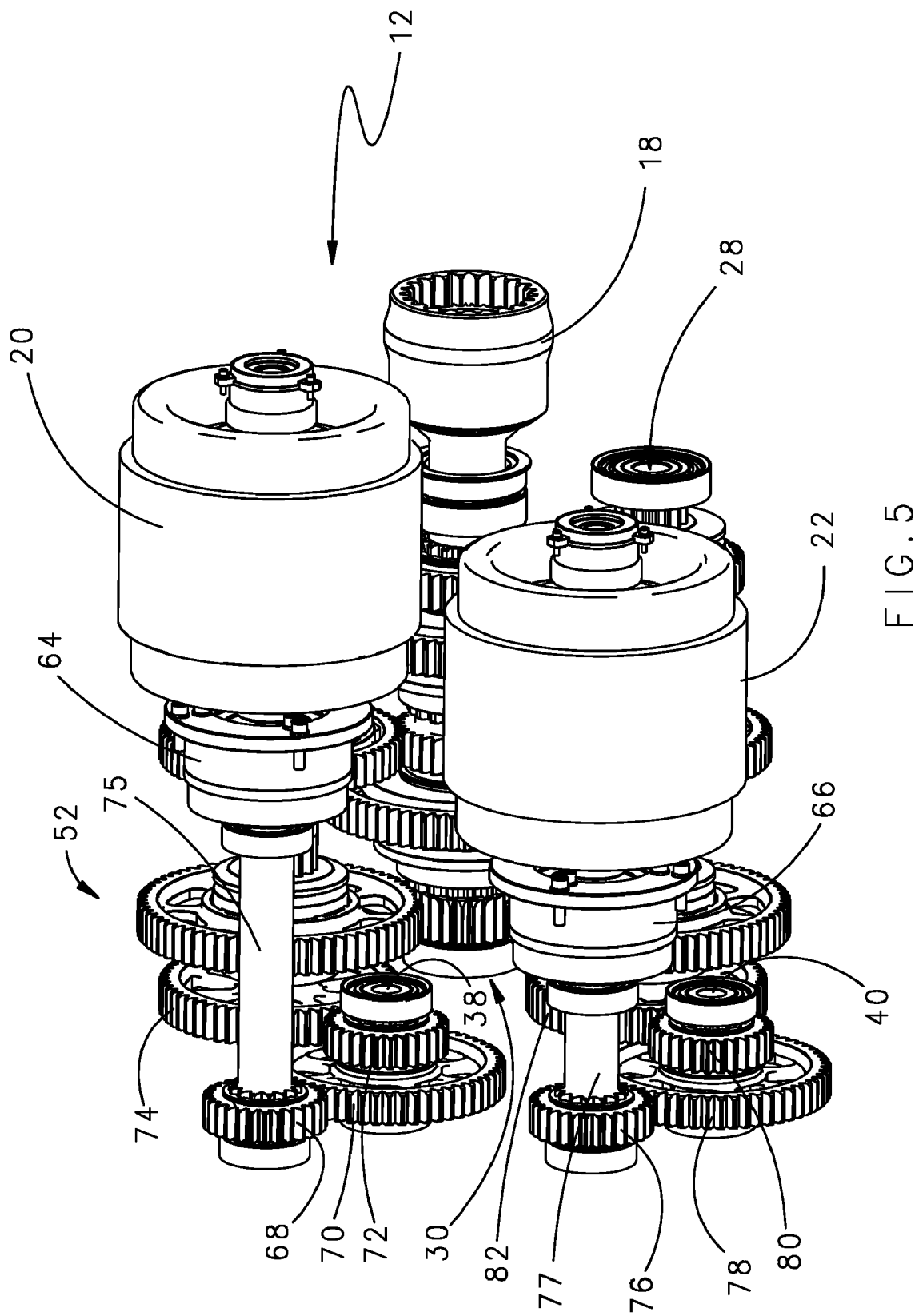
FIG. 5 is another perspective view of the example driveline assembly.

Referring to FIGS. 3, 4 and 5 the example driveline assembly 12 is illustrated with the housing 24 removed for clarity purposes. The example driveline assembly 12 includes the first and second motors 20, 22 that drive corresponding first and second input shafts 26, 28. The input shafts 26, 28 are driven by corresponding first and second jack shafts 38, 40. The first and second jack shafts 38, 40 are in turn driven by a motor shaft gear 76, 68 that is mounted on a shaft 75, 77 driven by the corresponding electric motor 20, 22.

Each of the electric motors 20, 22 drives the corresponding shaft 75, 77 through a decoupling clutch assembly 64, 66. The clutch assembly 64, 66 provides for the selective coupling of drive torque produced by the first and second electric motors 20, 22 to the corresponding first and second input shafts 26, 28. Each of the electric motors 20, 22 are individually and independently powered and controlled. Further, the clutch assemblies 64, 66 are also independently operated to selectively engage and provide torque to the corresponding input shaft 26, 28.

The first input shaft 26 supports a first gear set 32. The second input shaft 28 supports a second gear set 34. Each of the first and second gear sets 32, 34 drives a corresponding one of the set of output gears 36 on the output shaft 30. The plurality of output gears 36 are each engaged with the corresponding one of the first and second input gear sets 32, 34.

The output gears 36 are continuously engaged to corresponding gears of both the first and second gear sets 32, 34. Each of the gears of the first, second and output gear sets 32, 34, 36 are selectively coupled to the corresponding shaft by a decoupling mechanism 62. The example decoupling mechanism 62 includes gear engagement splines that selectively couples the corresponding gear to the corresponding shaft. A desired gear ratio is selected by coupling the appropriate gears to the corresponding input and output shafts. Other gear coupling devices are also within the contemplation of this invention.

One end of each of the first and second input shafts 26, 28 along with the output shaft 30 is supported by a bracket 54. The bracket 54 provides the desired spacing and mounting of one end of each of input shafts 26, 28 and the output shaft 30. Further, the housing 24 supports appropriate bearings that support each end of the first and second input shafts 26, 28 and the output shaft 30.

The first and second input shafts 26, 28 and the output shaft 30 include a first gear ratio including gears indicated at 46. The first gear ratio 46 includes a large diameter gear on the output shaft 30 and smaller diameter gears driven by the first and second input shafts 26, 28. The gear ratio between the output shaft 30 and the first input shaft 26 and the output shaft 30 and the second input shaft 28 are identical. A second gear ratio including gears disposed and selectively coupled to each of the corresponding shafts is identified at 48. Similarly, a third gear ratio 50 and a fourth gear ratio 52 are supported and selectively coupled to the corresponding shafts to facilitate changing of torque transfer and speed of the output 18.

The first input shaft 26 rotates about an axis 58, the second input shaft 28. rotates about an axis 60 and the output shaft 30 rotates about an axis 56. Each of the axis's 56, 58, and 60 are disposed in a parallel configuration. The example output 18 is attached and drives the final drive assembly 14 shown in FIGS. 1 and 2.

The specific arrangement of the example driveline assembly 12 includes identically paired gear sets supported on the first input shaft 26 and the second input shaft. 28 The identical gear sets allow for each of the electric motors 20, 22 to drive the output 18 at a desired speed. Although the disclosed example includes identical gear sets, gear sets with differing drive ratios are also within the contemplation of this invention. As is understood each of the motors 20, 22 are capable of providing the desired torque levels to the output 18 independent of the other. During normal operation, both the first and second electric motors 20, 22 drive the corresponding input shafts 26, 28 to provide power and torque to the output shaft 30 and thereby the output 18.

Figure 6:
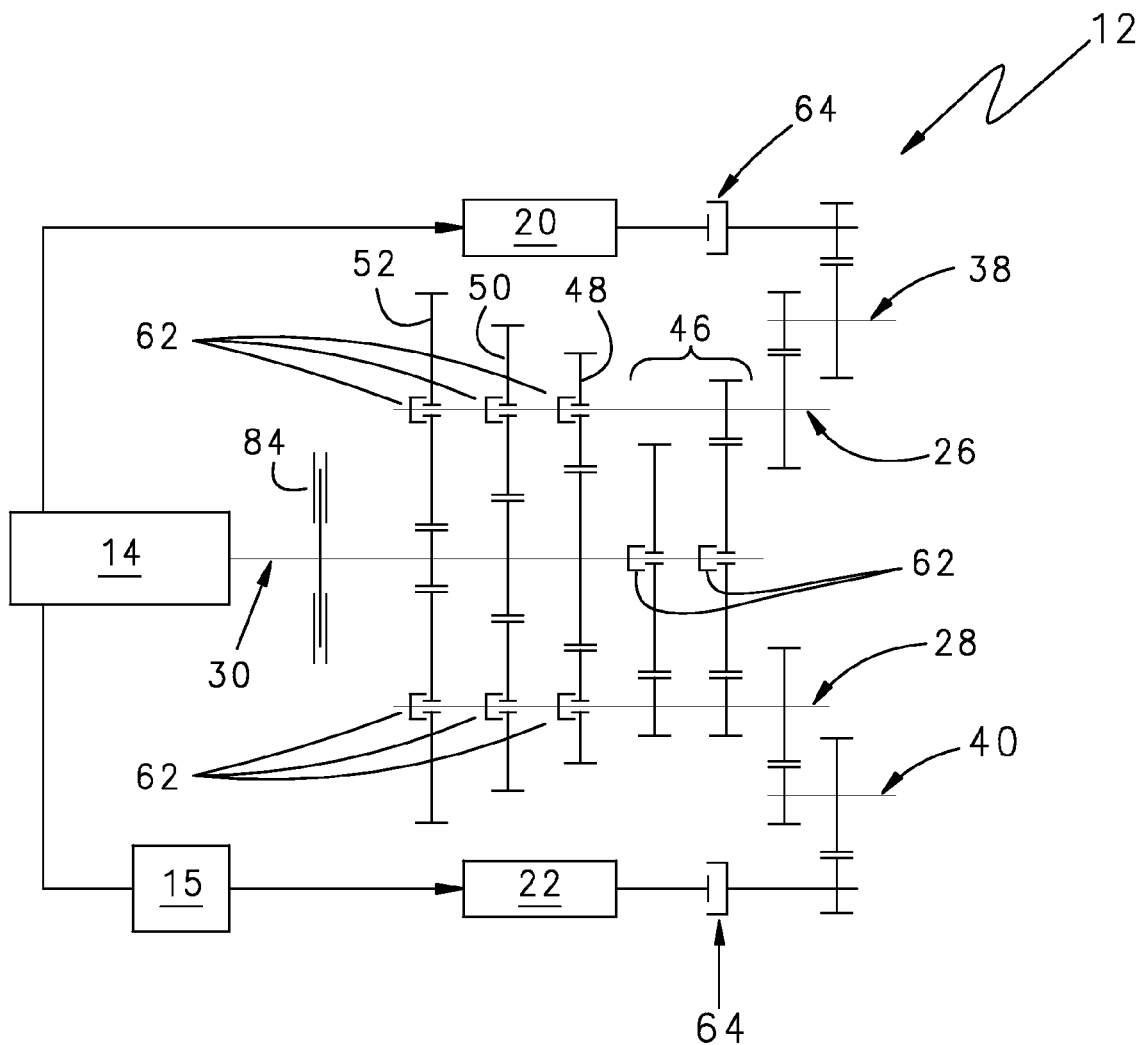
FIG. 6 is a schematic view of the example driveline assembly.

Referring to FIG. 6, the example driveline assembly 12 is schematically shown and includes the first and second electric motors 20, 22 selectively coupled to drive a corresponding one of the input shafts 26, 28. Each of the input shafts 26, 28 include identical first and second gear sets 32, 34 that drive the output shaft 30. During normal operation both the first electric motor 20 and the second electric motor 22 provide equal amounts of power to drive the output shaft 30. Desired speed is provided by selectively coupling the desired gear from each of the input shafts 26,28 and corresponding gear on the output shaft 30 such that the desired gear ratio drives the output shaft 30 where all over gears remain engaged but rotate relative to the output shaft 30 and are simply operating in a free wheeling manner.

Figure 7A:
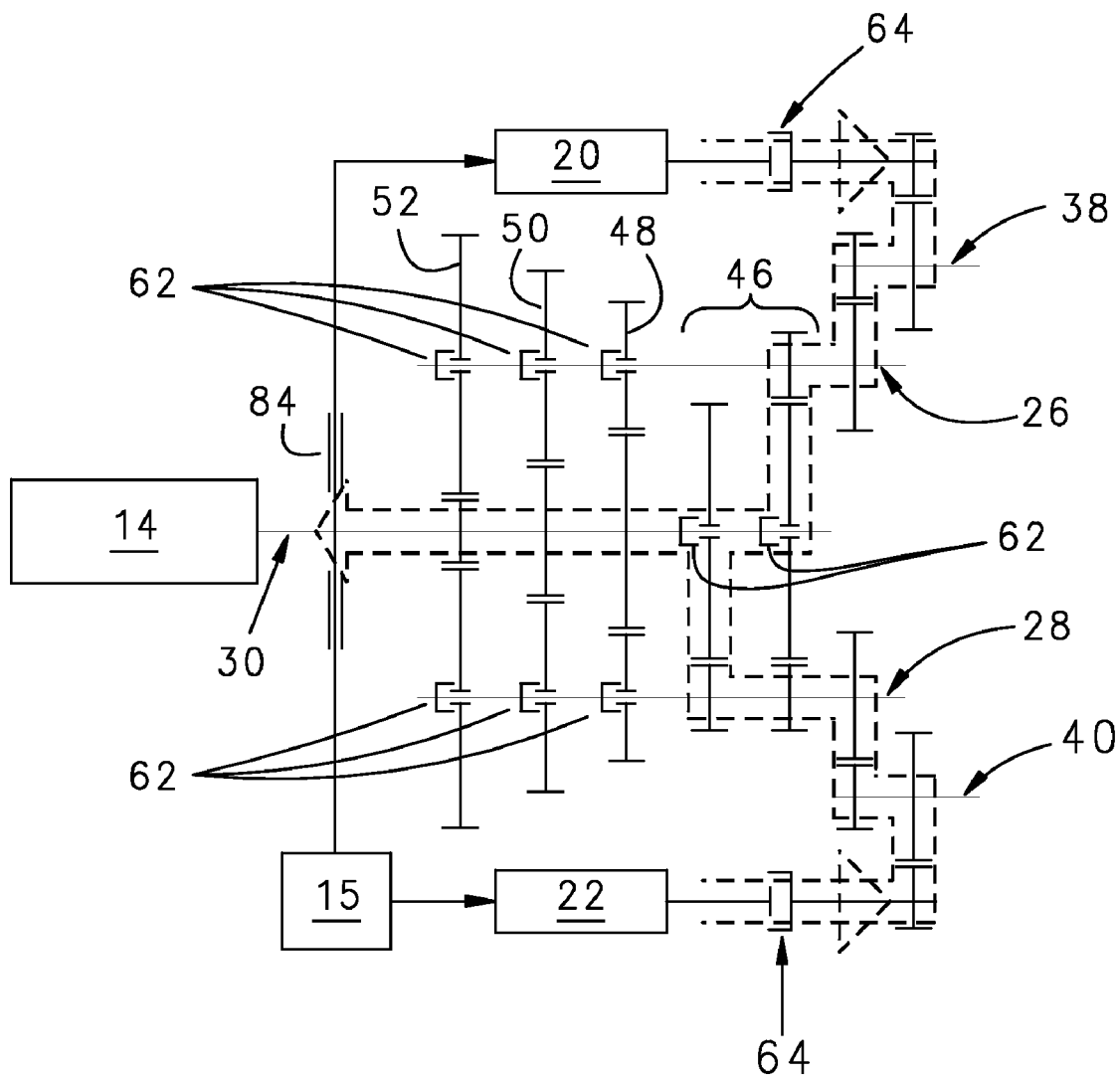
FIG. 7A is a schematic view of power flow through the example driveline assembly in a first gear.

Referring to FIG. 7A, the power output during normal operation is schematically illustrated. The example power output is transmitted from the motors 20,22 through the shafts 75,77 driven by the electric motors 20,22 through the corresponding jack shafts 38, 42 to the corresponding input shafts 28, 26 and finally to the output shaft 30. The example driveline assembly 12 is shown in first gear 46. In first gear 46, power is transferred to the output shaft 30 through gears of identical ratio on each of the first and second input shafts 26, 28.

Figure 7B:
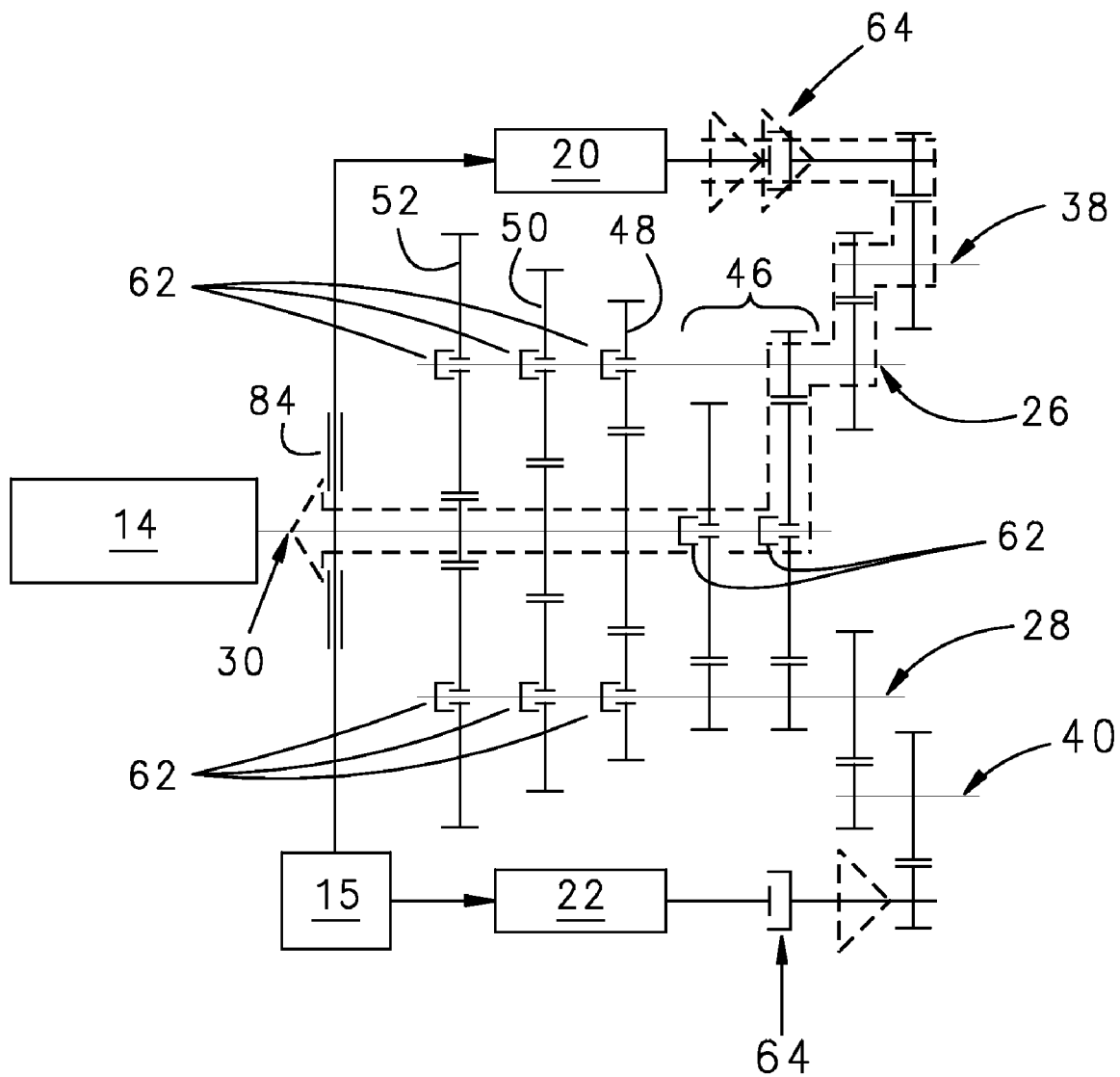
FIG. 7B is a schematic view of power flow during a first stage of a gear change.
Figure 7C:
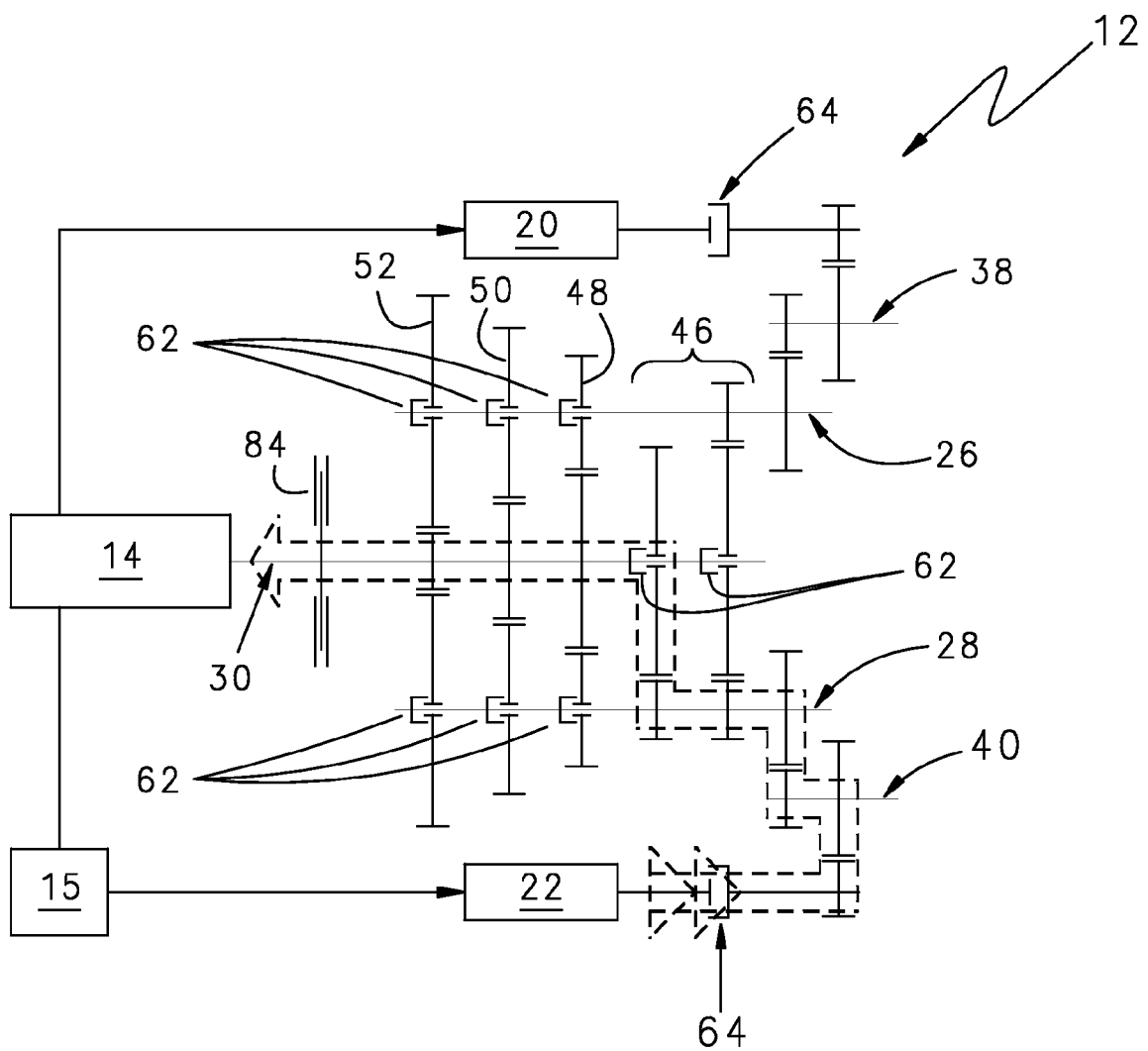
FIG. 7C is a schematic view of power flow during a second stage of a gear change.
Figure 7D:
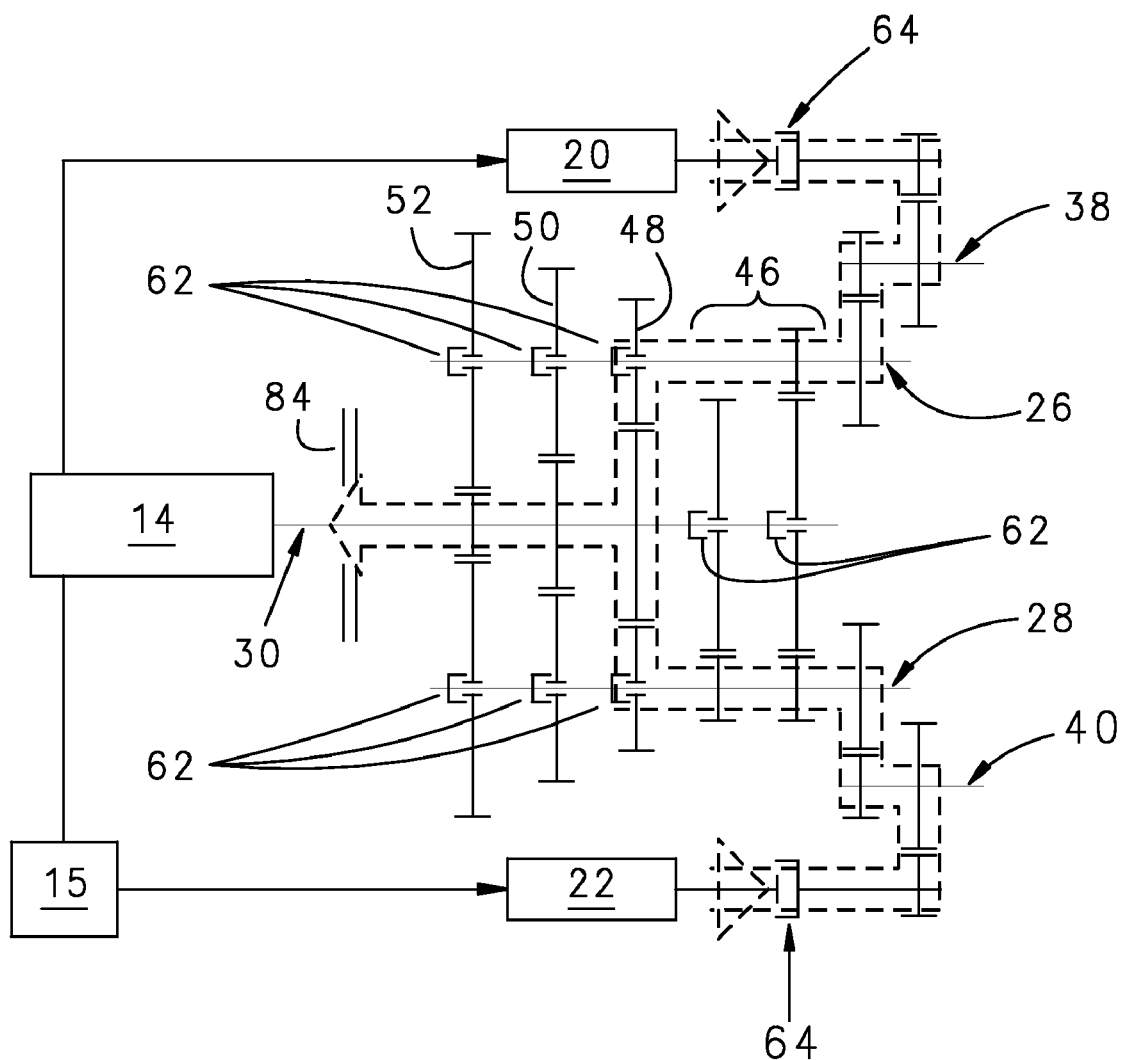
FIG. 7D is a schematic view of power flow through the example driveline assembly in a second gear.

Referring to FIG. 7B, power transfer during the first stage of a gear ratio change is schematically illustrated. During the first stage of the gear shift, power is increase to the first electric motor 22 to maintain desired output torque and speed of the output shaft 30.

The power from the second electric motor 22 is reduced to a zero torque during the shifting process. The clutch 64 remains coupled to the second electric motor 22. Once power is reduced from the second input shaft 28, the current gear ratio is deselected and the desired gear ratio is selected by engaging the corresponding coupling devices 62

During this momentary reduction in power output from the second electric motor 22, the first electric motor 20 provides an increased level of power output, for example comparable to the level of power provided by both the first and second electric motors 20, 22 during normal operation. Once the desired gear change is accomplished between the second input shaft 28 and the corresponding gear on the output shaft 30, power output from the first electric motor 20 is reduced to a zero or low torque level at substantially the same instance power output for the second electric motor 22 is increased, for example to match that torque that is provided during normal operation by both the first and second electric motors 20, 22.

The appropriate gear is coupled to the first input shaft 26 to drive the output shaft 30. The driveline assembly 12 is switched in this illustrated example from the first gear ratio 46 to the second gear ratio 48. Other gear shifts, either up or down are accomplished utilizing the same sequence of steps.

Once the second portion of the gear change is accomplished then both the first and second electric motors 20, 22 are reengaged to again provide the normal combined power output to the output shaft 30. Corresponding output during normal operation is a combination of the first and second electric motors 20, 22 such that each of the electric motors 20, 22 are operated well within their power output capacities.

Further, because each of the first and second electric motors 20,22 each can separately drive the output shaft 30 at desired levels, a failure of either of the first and second electric motors 20,22 can be compensated by increasing the power to the remaining electric motor. This facilitates operation during a single point of a failure of the driveline assembly 12. In the event that one of the electric motors 20, 22 is damaged or cannot operate for some reason the other electric motor can operate at a level to provide desired output to the final drive 14.

The electric drive line assembly of this invention is completely separated mechanically from any power generating or conversion device such that only the first and second electric motors are utilized to drive the final drive 14. Further, the electric motors 20, 22 are controlled by a controller 25 in a manner that provides constant uninterrupted output of torque and speed to the output shaft 30.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electrically powered driveline assembly comprising:
a first electric motor driving a first input shaft,
a second electric motor driving a second input shaft,
a plurality of gears driven by one of said first electric motor and said second electric motor;
an output shaft including a plurality of output gears corresponding with and driven by a selected gear from said plurality of gears; and
a controller for operating the first and second electric motors and controlling engagement of the plurality of gears to the plurality of output gears, wherein the controller equalizes an output power of the first and second electric motors once a desired one of the output gears is engaged.

2. The electrically powered driveline assembly as recited in claim 1, wherein said plurality of gears comprises a first plurality of selectable gears driven by said first input shaft, and a second plurality of selectable gears driven by said second input shaft.

3. The electrically powered driveline assembly as recited in claim 2, wherein said output gears are driven by a selected gear from each of said first plurality of gears and a selected gear from said second plurality of gears.

4. The electrically powered driveline assembly as recited in claim 3, wherein said selected gear from said first plurality of gears and said selected gear from said second plurality of gears concurrently drive said output shaft through a corresponding one of said plurality of output gears.

5. The electrically powered driveline assembly as recited in claim 2, wherein said first plurality of gears and said second plurality of gears comprise like gear ratio combinations.

6. The electrically powered driveline assembly as recited in claim 1, including a first coupling device for coupling the first electric motor to the first input shaft and a second coupling device for coupling the second electric motor to the second input shaft.

7. The electrically powered driveline assembly as recited in claim 2, wherein each of the first and second plurality of gears include a gear engagement device for coupling each individual gear to the corresponding one of the first and second input shafts.

8. The electrically powered driveline assembly as recited in claim 1, wherein the output shaft rotates about a separate and parallel axis in relation to the first and second input shafts.

9. The electrically powered driveline assembly as recited in claim 1, wherein the controller controls operation of the first and second electric motors such that at least one of the first and second electric motors is engaged to power the output shaft.

10. The electrically powered driveline assembly as recited in claim 2, wherein a gear from at least one of the first and second plurality of gears is always engaged to deliver torque to the output shaft.

11. The electrically powered driveline assembly as recited in claim 2, wherein the controller operates to increase power output from one of the first and second electric motors to maintain a desired power output to the output shaft while simultaneously reducing power output from the other of the first and second electric motors to facilitate a gear change on the corresponding one of the first and second input shafts.

12. The electrically powered driveline assembly as recited in claim 1, wherein each of the first and second electric motors include a common power output capacity capable of driving the output shaft at a desired speed for continuous period.

13. The electrically powered driveline assembly as recited in claim 1, wherein the driveline assembly includes two driveline assemblies powering first and second drive members independent of each other.

14. The electrically powered driveline assembly as recited in claim 2, wherein said first plurality of gears and said second plurality of gears comprise identical gear ratio combinations.

15. A method of operating an electric motor powered driveline assembly including the steps of:
a) selectively driving a plurality of gears with at least one of a first electric motor and a second electric motor;
b) continuously driving an output shaft including a plurality of output gears engaged with a selected one of the plurality of gears driven by a selected one of said first electric motor and said second electric motor; and
c) equalizing power output of the first and second electric motors once a desired one of the plurality of gears is engaged.

16. The method as recited in claim 15, wherein said plurality of gears comprises a first plurality of gears driven by the first electric motor and a second plurality of gears driven by the second electric motor.

17. The method as recited in claim 16, including the step of changing from a current gear ratio to a desired gear ratio by reducing power output from the first electric motor and increasing power output by the second electric motor to maintain a desired output of the output shaft while changing a selected gear of the first plurality of gears and subsequently increasing power output of the first electric motor and reducing power output from the second electric motor while changing a selected gear of the second plurality of gears.

18. A method of operating an electric motor powered driveline assembly including the steps of:
selectively driving a plurality of gears with at least one of a first electric motor and a second electric motor, wherein said plurality of gears comprises a first plurality of gears driven by the first electric motor and a second plurality of gears driven by the second electric motor, wherein the first plurality of selectable gears are identical to the second plurality of selectable gears; and
continuously driving an output shaft including a plurality of output gears engaged with a selected one of the plurality of gears driven by a selected one of said first electric motor and said second electric motor.

19. An electrically powered driveline assembly comprising:
a first electric motor driving a first input shaft,
a first plurality of gears driven by the first electric motor;
a second electric motor driving a second input shaft,
a second plurality of gears driven by said second electric motor, where the second plurality of gears is identical to the first plurality of gears;
an output shaft including a plurality of output gears corresponding with and driven by a selected gear from at least one of said first and second plurality of gears; and
a controller for operating the first and second electric motors and controlling engagement of the plurality of gears to the plurality of output gears.

20. The electrically powered driveline assembly as recited in claim 19, wherein the controller equalizes power output from the first and second electric motors once a desired gear is engaged for each of the first and second plurality of gears.

* * * * *